US012709278B2

(12) United States Patent
Almási et al.

(10) Patent No.: US 12,709,278 B2
(45) Date of Patent: Aug. 18, 2026

(54) DRIVER DISTRACTION FROM UNCERTAIN GAZE ESTIMATION

(71) Applicant: TOBII AB, Danderyd (SE)

(72) Inventors: Péter Almási, Danderyd (SE); Niklas Ollesson, Stockholm (SE); Anjin Gabriel Alexander Santiago, Spånga (SE); Oskar Nordmark, Stockholm (SE)

(73) Assignee: TOBII AB, Danderyd (SE)

( * ) Notice: Subject to any disclaimer, the term of this patent is extended or adjusted under 35 U.S.C. 154(b) by 107 days.

(21) Appl. No.: 18/733,899

(22) Filed: Jun. 5, 2024

(65) Prior Publication Data

US 2024/0416923 A1 Dec. 19, 2024

(30) Foreign Application Priority Data

Jun. 16, 2023 (SE) .................................... 2350740-3

(51) Int. Cl.
*B60W 40/08* (2012.01)
*G06V 10/70* (2022.01)
*G06V 20/59* (2022.01)

(52) U.S. Cl.
CPC ............. *B60W 40/08* (2013.01); *G06V 10/70* (2022.01); *G06V 20/597* (2022.01); (Continued)

(58) Field of Classification Search
CPC ......... B60W 40/08; B60W 2040/0818; B60W 2420/403; B60W 2540/225; (Continued)

(56) References Cited

U.S. PATENT DOCUMENTS 8,487,775 B2 * 7/2013 Victor .................... A61B 5/163 340/576
10,552,695 B1 2/2020 Bush et al.
(Continued)

FOREIGN PATENT DOCUMENTS

WO 201914488 A1 8/2019
WO 2020061650 A1 4/2020

OTHER PUBLICATIONS

Swedish Search Report regarding SE App. No. 2350740-3 dated Jan. 24, 2024.

*Primary Examiner* — Daryl C Pope
(74) *Attorney, Agent, or Firm* — Christopher Ignatius Moylan

(57) ABSTRACT

Method and apparatus, including computer programs, for providing a driver distraction signal and/or a system degradation signal indicating a reliability of the driver distraction signal, based on a gaze of a driver of a vehicle. Images of the driver of the vehicle are received, which contain information indicating a gaze of the driver. For each image, a gaze region for the driver is determined, including a gaze point and a gaze uncertainty value. For each image, the gaze region is associated with a region among several regions around the vehicle, wherein the regions include at least one pre-defined attentive region and at least one pre-defined inattentive region. Based on the determined gaze region, the gaze uncertainty value, and the region for a plurality of images, a driver distraction level and/or system degradation level indicating a reliability of the driver distraction level are determined.

19 Claims, 11 Drawing Sheets

(52) U.S. Cl.
CPC ............... *B60W 2040/0818* (2013.01); *B60W 2420/403* (2013.01); *B60W 2540/225* (2020.02); *B60W 2540/229* (2020.02)

(58) Field of Classification Search
CPC ............. B60W 2540/229; G06V 10/70; G06V 20/597; G06V 40/18; G06V 10/25; G06V 10/84; G06N 20/00; B60K 28/066; G06F 3/013; A61B 5/163; A61B 5/18
See application file for complete search history.

(56) References Cited

U.S. PATENT DOCUMENTS

| | | | | |
|---|---|---|---|---|
| 11,017,249 | B2 * | 5/2021 | Yu ...................... | G02B 27/0101 |
| 2018/0129891 | A1 | 5/2018 | Ryu et al. | |
| 2019/0152390 | A1 | 5/2019 | Levkova et al. | |
| 2020/0148220 | A1 | 5/2020 | Kim et al. | |
| 2021/0248399 | A1 | 8/2021 | Martin et al. | |
| 2022/0366568 | A1 | 11/2022 | Arar et al. | |

* cited by examiner

DRIVER DISTRACTION FROM UNCERTAIN GAZE ESTIMATION

CROSS-REFERENCE TO RELATED APPLICATION

The present application claims priority to Swedish patent application No. 2350740-3, filed 16 Jun. 2023, entitled "Driver Distraction from Uncertain Gaze Estimation," and is hereby incorporated by reference in its entirety.

TECHNICAL FIELD

The present disclosure relates to gaze estimation. More specifically, the present disclosure generally relates to a system and method for monitoring a driver of a vehicle at least in part based on gaze estimation.

BACKGROUND

Gaze estimation is the process of predicting the direction of a person's gaze by analyzing the position and movement of their eyes. It involves using computer vision techniques to detect and track the eyes, and then analyzing, often using machine learning algorithms, the eye movements to determine and/or predict where the person is looking. Gaze estimation has applications in a variety of fields, including human-computer interaction or attention computing, virtual/augmented reality, and health or advertising research.

One application of gaze estimation is in the context of driver monitoring systems (DMSs), which allow monitoring a driver of a vehicle, for example, to alert the driver if they are not looking at the road, thereby improving the safety of the driver and the people around the vehicle. Such monitoring is typically done using gaze estimation of the driver in combination with information about car geometry, such as the location of the windshield, dashboard, screens, mirrors, etc. in the car, to determine where the driver is looking. This is typically done as a relatively straightforward gaze-to-object-mapping, which can be realized by a person having ordinary skill in the art and using known techniques.

However, there are often situations in a vehicle where the gaze determination is degraded. Some examples of degraded gaze determination include when there is strong sunlight over eyes, when the driver is wearing dark sunglasses, when there are high head angles (i.e., only part of one eye seen in the camera that is used for the gaze tracking). Typically, these situations are managed by classifying whether the driver's eyes are visible "enough" or not, that is, a binary quality signal of the gaze is obtained, which indicates whether the gaze determination is usable or not.

SUMMARY

In some aspects, the techniques described herein relate to a system configured to provide a driver distraction signal and/or a system degradation signal indicating a reliability of the driver distraction signal, based on a gaze of a driver of a vehicle. The system includes a processor and a memory including instructions executable by the processor. The system is configured to: receive a plurality of images of the driver of the vehicle, wherein the images contain information indicating a gaze of the driver; determine, for each image, a gaze region for the driver, wherein the gaze region includes a gaze point and a gaze uncertainty value; associate, for each image, the gaze region with a region among a plurality of regions around the vehicle, wherein the plurality of regions includes at least one pre-defined attentive region and at least one pre-defined inattentive region; determine, based on the determined gaze region, the determined gaze uncertainty value, and the associated region of the vehicle for a plurality of images, a driver distraction level and/or system degradation level indicating a reliability of the driver distraction level; and output a driver distraction signal and/or a system degradation signal, wherein the driver distraction signal is indicative of the determined driver distraction level and the system degradation signal is indicative of the determined system degradation level.

In one embodiment, the gaze region is a probability distribution with the gaze point being a mean value of the probability distribution and the gaze uncertainty value being a standard deviation of the probability distribution.

In one embodiment, the driver distraction level is based on what portion of the gaze region falls within an attentive region or an inattentive region, respectively.

In one embodiment, a high driver distraction level is obtained when a significant portion of the gaze region falls within an inattentive region, and a low driver distraction level is obtained when a significant portion of the gaze region falls within an attentive region.

In one embodiment, the system is further configured to: set one or more threshold signal values for the distraction signal and the system degradation signal to indicate one or more levels of driver distraction and one or more levels of system degradation, respectively.

In one embodiment, the system is further configured to: categorize the driver distraction signal into one of the following categories: attentive, distracted, degraded, and undetermined; and associate the determined reliability with the determined category.

In one embodiment, the gaze region is determined using a machine-learning based gaze estimation algorithm.

In one embodiment, the system is further configured to control an apparatus of the vehicle based on the output driver distraction signal and/or the system degradation signal.

In some aspects, the techniques described herein relate to a method for providing a driver distraction signal and/or a system degradation signal indicating a reliability of the driver distraction signal, based on a gaze of a driver of a vehicle, including: receiving a plurality of images of the driver of the vehicle, wherein the images contain information indicating a gaze of the driver; determining, for each image, a gaze region for the driver, wherein the gaze region includes a gaze point and a gaze uncertainty value; associating, for each image, the gaze region with a region among a plurality of regions around the vehicle, wherein the plurality of regions includes at least one pre-defined attentive region and at least one pre-defined inattentive region; determining, based on the determined gaze region, the determined gaze uncertainty value, and the associated region of the vehicle for a plurality of images, a driver distraction level and/or system degradation level indicating a reliability of the driver distraction level; and outputting a driver distraction signal and/or a system degradation signal, wherein the driver distraction signal is indicative of the determined driver distraction level and the system degradation signal is indicative of the determined system degradation level.

In some aspects, the techniques described herein relate to a computer program including instructions which, when executed on at least one processor, cause the at least one processor to carry out the method. The computer program product may be implemented by a non-transitory computer-readable medium encoding instructions that cause one or more hardware processors located in at least one computer hardware device in a system of said type to perform the method steps in question.

In some aspects, the techniques described herein relate to an eye tracking system configured to provide a driver distraction signal, based on a gaze.

In some aspects, the techniques described herein relate to a vehicle including the system.

BRIEF DESCRIPTION OF THE DRAWINGS

In the following, the invention will be described in detail, with reference to exemplifying embodiments of the invention and to the enclosed drawings, wherein.

Like reference symbols in the various drawings indicate like elements.

DETAILED DESCRIPTION

The various embodiments of the present invention relate to techniques for providing a driver distraction signal and/or a system degradation signal indicating a reliability of the driver distraction signal, based on the gaze of a driver of a vehicle. As was described above, in most conventional systems for gaze detection in the context of vehicles, a classification is made as to whether the driver's eyes are sufficiently visible or not (e.g. due to strong sunlight over eyes, use of sunglasses, high head angles, etc., as described above) i.e., there is a binary quality signal of the gaze.

In contrast, in accordance with the various embodiments of the invention described herein, there is an estimated error on the gaze estimation, based on how "difficult" the images look. As a result, it is possible to obtain a much more granular idea of how good the estimated gaze is, which expands the possible use cases for the collected gaze data.

For example, that information can be leveraged to reduce visual distraction, as well as performing a diagnostic or "self-test" and alert the car/driver when the gaze detection/driver distraction feature is not working properly.

The term gaze tracking is used herein to refer to any method or system that detects and/or monitors the location of an eye and/or the direction of the gaze of an eye(s). The skilled reader will be aware of and understand such systems. As such, the system in itself will not be described in any greater detail herein, but the description will rather focus on how the data collected by the system is processed and used to provide information to the driver of the vehicle or to other interested parties.

It should be realized that while the word "car" is used throughout this specification as being representative of a vehicle, the techniques described herein can be applied to essentially any vehicle, including cars, trucks, or even train engines or airplanes, or simulators of such environments, where it may be valuable to know not only the gaze of the driver/engineer/pilot, but also having some information or quality measure about the reliability of the information. The various embodiments of the invention will now be described by way of example and with reference to the figures. However, it should be noted that these are merely exemplary embodiments and that many other embodiments fall within the scope of the claims.

Figure 1:
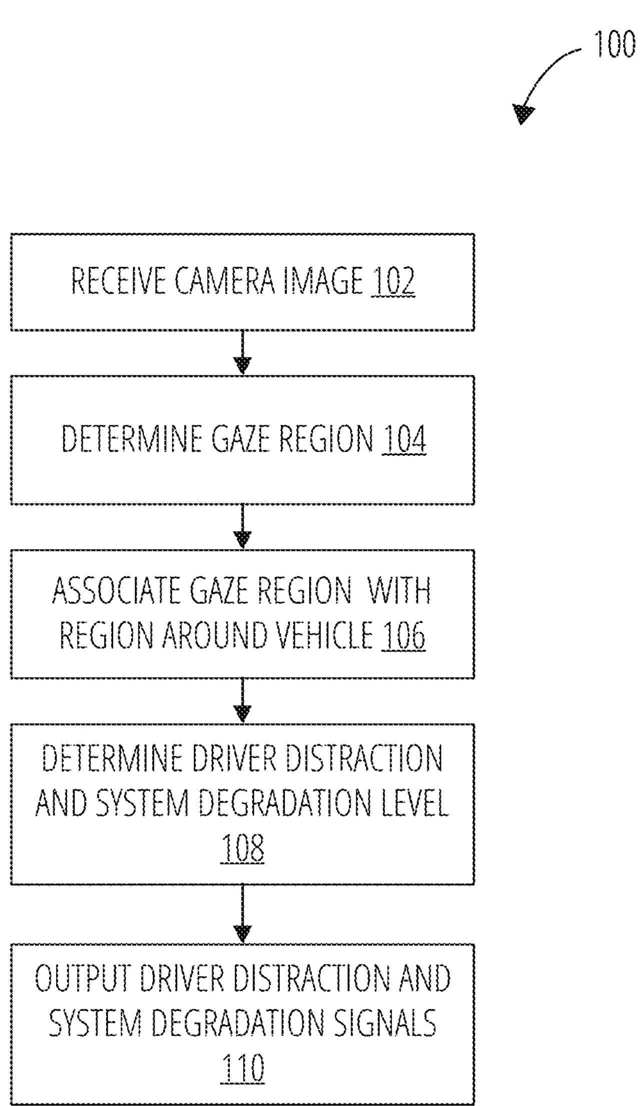
FIG. 1 is a flowchart showing a method for providing a driver distraction signal and/or a system degradation signal indicating a reliability of the driver distraction signal, based on the gaze of a driver of a vehicle, in accordance with some embodiments.
Figure 2:
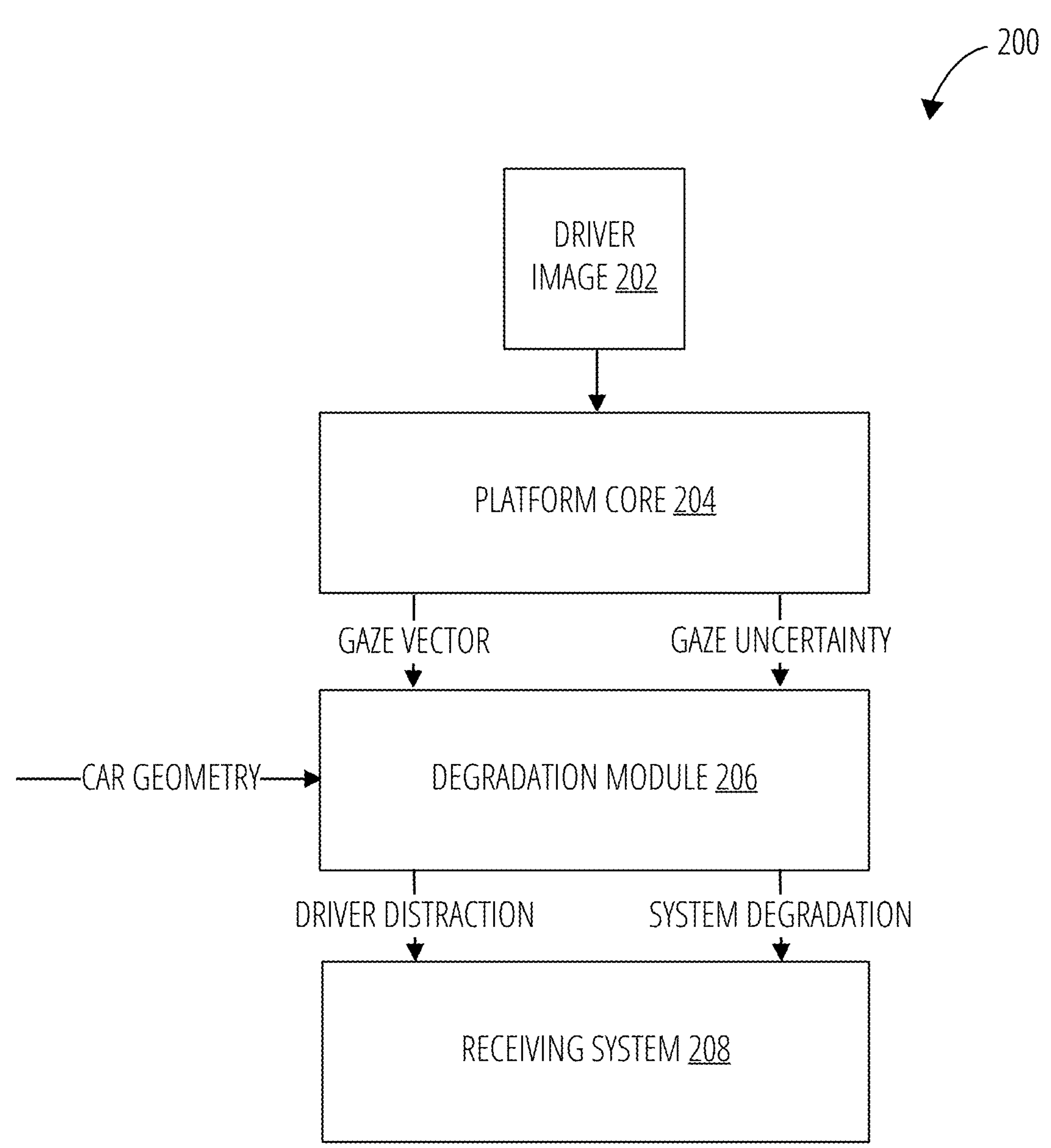
FIG. 2 is a block diagram showing a system for providing a driver distraction signal and/or a system degradation signal indicating a reliability of the driver distraction signal, based on the gaze of a driver of a vehicle, in accordance with some embodiments.

FIG. 1 is a flowchart showing a method 100 for providing a driver distraction signal and a system degradation signal indicating a reliability of the driver distraction signal, based on the gaze of a driver of a vehicle, in accordance with some embodiments. FIG. 2 is a block diagram showing a system 200 in which the method 100 can be performed in accordance with some embodiments. As shown in FIG. 1, the method 100 starts by receiving 102 a driver image 202 of the driver of a vehicle. The resolution of the image 202 needs to be sufficiently high to allow estimation of the gaze of the driver. This will typically depend on the placement and field of view of the camera, but in general a few megapixels are sufficient. In some embodiments, the images are near-infrared images, and in some embodiments, the images are color images, such as RGB (Red Green Blue) images. In general, the camera placement in the vehicle is such that the typical driver head positions and the eyes of the driver are visible to the camera that captures them for most head rotations. There are several different camera placements and camera specifications that fulfill this requirement, and which can be determined by a person having ordinary skill in the art.

The driver image 202 is then processed by a core processing module 204 of an eye tracking system. Eye tracking system and methods, sometimes referred to as gaze detection systems and methods, include, for example, products produced and available from Tobii Technology AB, and which operate by using near-infrared illumination and an image sensor to detect reflection from the eye of a driver. An example of such a gaze detection system is described in U.S. Pat. No. 7,572,008. Other alternative gaze detection systems may also be employed by the invention, regardless of the technology behind the gaze detection system. The eye tracking system may employ its own processor or the processor of another device (i.e., the processor/computer), or even a cloud-based distributed system in some embodiments, to interpret and process data received. When an eye tracking system is referred to herein, both possible methods of processing data are referred to.

In one embodiment, the processing that is done by the core processing module 204 involves determining 104 a gaze region and a gaze uncertainty, which indicate where the driver of the vehicle is looking (e.g., at the windshield, the instrument panel, etc.). The gaze region is determined by the core processing module 204 by defining a gaze vector originating at the eye (cornea) of the driver and ending at a gaze point inside the vehicle (e.g., on the windshield or instrument panel). There are many different types of available algorithms that allow determination of a gaze region. One example is a head pose estimation algorithm that can give an indication of where a driver is looking based on determining a head pose of the driver. The head pose can be determined based on a three-dimensional frame of reference, where (i) a three-dimensional position indicates the location of the head, and where (ii) roll about a front-to-back axis, tilt about a left-to-right axis, and turn about a top-to-bottom axis can be measured to indicate the orientation of the driver's head. When the driver's head position has been determined, based on the assumption that the driver generally looks straight ahead, the position of the driver's gaze can also be determined. While this approach may be less accurate than some precise gaze point estimation algorithms, it lends itself well to determining gaze regions in some situations.

In other embodiments, the gaze estimation algorithm determines a pupillary position of at least one eye of the driver in order to determine where the driver is looking. Such an approach is known in the art and will be discussed only in brief detail here. This can be achieved based on knowledge of the distance between the driver's pupils with respect to one or more facial landmarks, for example a nose, mouth, ear, or other facial feature of the driver. These can be determined when the driver is looking forward, and then any changes in these distances can indicate a change in position of the pupil away from a forward-looking position. The position of the pupil can then be used to determine in which direction the driver is looking. In some embodiments, at least three facial "landmarks" are used to determine a relative distance to the pupil. Similar to head pose estimation, this approach is sometimes less accurate than precise gaze point estimation algorithms, but is well suited to determining a coarser gaze region, which may be sufficient depending on the circumstances at hand.

In yet other embodiments, the gaze estimation algorithm includes a machine-learning based gaze estimation algorithm. The algorithm may be trained based on several ground truth gaze locations generated by an apparatus rendering a visual stimulus. For example, the driver may be asked to look at one of an array of lights that are illuminated in different positions in the environment, corresponding to different regions inside or outside the vehicle. For example, some of the stimulus points are normal points on the driver image 202, as in a conventional data collection and calibration of eye-tracking systems. These ground truth gaze locations may be presented in two-dimensional and/or three-dimensional positions relative to the driver. The machine learning system can observe the driver when looking at the different stimuli, and learn when the driver is looking at different regions. For example, the system may take an image of the driver when the driver is looking at a particular stimulus, and identify certain features from the image (for example the head pose or pupil position of the driver). The system may use this in combination with the geometry of the system, for example the distances between the driver, the stimuli and/or the device capturing the image of the driver. In this way, the algorithm learns features of an image of a driver that indicate the driver is looking at a particular location. The trained machine learning algorithm can then be used to determine when a driver of vehicle is looking at different regions associated with the vehicle. As with the algorithms discussed above, this approach may be less accurate than precise gaze point estimation algorithms, but is well suited to determining a coarser gaze region, which may be sufficient in some embodiments.

As was noted above, in addition to the gaze region, the various embodiments described herein also determine a gaze uncertainty. The gaze uncertainty can be thought of conceptually as a "circle" or area around the gaze point, where a larger circle indicates a larger gaze uncertainty. As was noted above, the gaze point and gaze region represent where the driver is looking and can be measured using many of the techniques described above. The gaze uncertainty, in accordance with the various embodiments described herein, can be derived by interpreting the outputs from the gaze determination algorithms as probability distributions. These probability distributions should be seen as being a condition on the input image. While it may seem odd, at a first glance, to have a distribution for a single image, since an image has a definitive ground truth, it is noted that this ground truth may not be unique, determined by the image alone. There exists, at least in theory, identical images having different ground truths. For example, consider an image of a person whose eyes cannot be fully seen in the image. While the person definitely looked in a specific direction at the time the image was captured, there is a distribution of possible directions in which the person could have been looking (i.e., a distribution of gaze points), given the information captured in the image, for example the person could be looking up or down or at some specific location, however, due to the fact that the eyes cannot be fully seen in the image, such situation would result in identically looking images. This distribution is not available, but can be handled using a properly constructed loss function for training the model. For example, the Kullback-Leibler divergence (KL-divergence) can be used as a metric to measure the "difference" between two distributions. By minimizing the KL-divergence, a predicted distribution can be fit to an actual distribution. This choice can be justified by noting that the KL-divergence can be interpreted as the average difference of the number of bits required for encoding samples of the actual distribution using a code optimized for the predicted distribution, rather than a code optimized for the actual distribution. If the KL-divergence is zero, the prediction is optimal in the sense that all uncertainty comes from the value being measured, and not from the process of measuring it. In some embodiments, this predicted distribution can be modeled as a normal distribution, with the mean value being the gaze point and the standard deviation being the gaze uncertainty.

Figure 4:
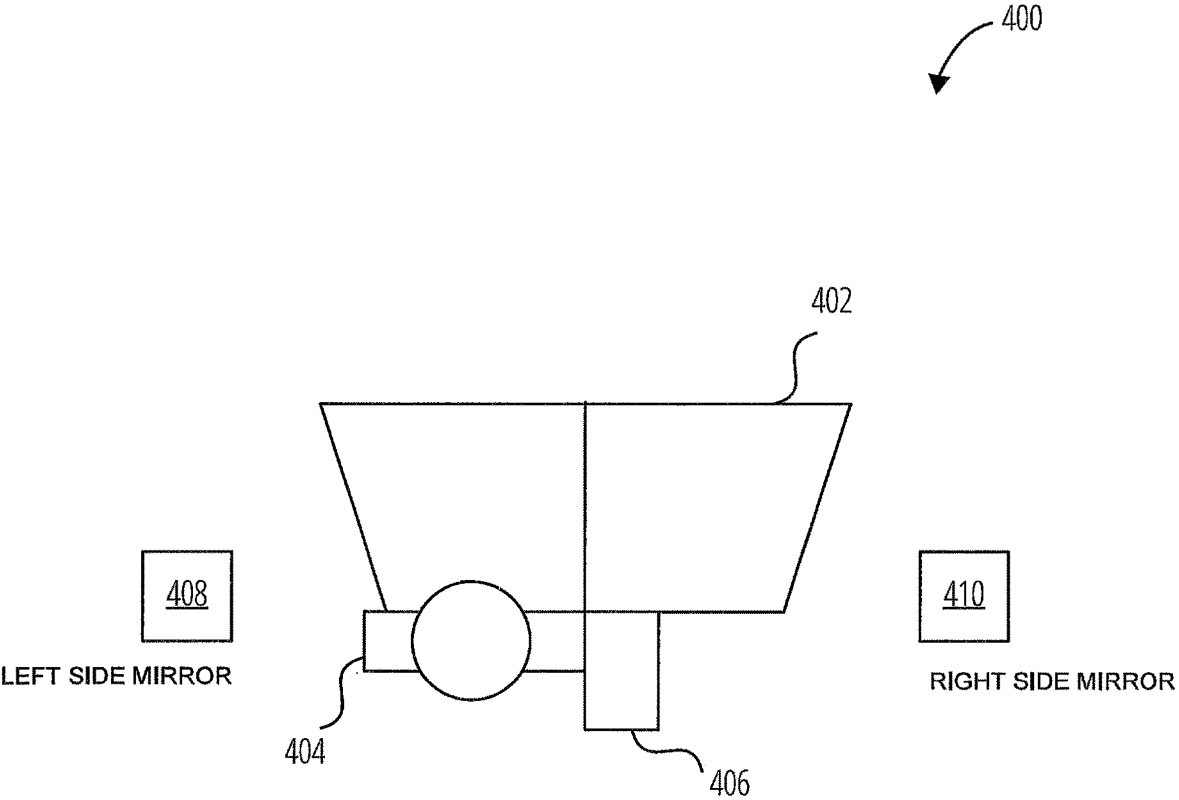
FIG. 4 is a schematic view of a car geometry, used in a system in accordance with some embodiments.

Next, the gaze vector and gaze uncertainty are associated, 106, with the particular geometry of the vehicle by a degradation module 206. To better understand this, please consider FIG. 4, which shows a schematic view of display/view related features of a car geometry, in accordance with some embodiments. In particular, FIG. 4 shows a schematic view of a car geometry 400, which includes a windshield 402, a dashboard 404, an entertainment panel 406, a left side mirror 408, and a right side mirror 410. The windshield 402, is schematically divided down the middle into an attentive zone and an inattentive zone, which will be described in further detail below. The dashboard 404 (also commonly known as instrument panel) is used to show information relevant to the operation of the vehicle to the driver, as is commonly known. The entertainment panel 406 can be, for example, a music system or a screen that connects to the driver's cell phone. These different features (or portions thereof) of the car geometry 400 can be categorized into attentive zones and inattentive zones, respectively. As is clear, some of these zones may be inside the vehicle (e.g., the dashboard 404 and the entertainment panel 406) and some of the zones may be located outside the vehicle (e.g., the left side mirror 408, the right side mirror 410 and the road visible through the driver side of the windshield 402). Thus, the attentive and inattentive zones should not be considered as being exclusively inside the vehicle. An example of an attentive zone can be a portion of the windshield 402 that is right in front of the driver, and where it is known that when the gaze of the driver falls within that zone, her attention is on the road ahead of her. An example of an inattentive zone can be the entertainment panel 406, or certain portions of the dashboard 404 that display information that is not relevant to the operation of the vehicle while driving. When the driver's gaze falls within an inattentive zone, it is reasonable to assume that her attention to what is happening on the road ahead is distracted or degraded. Hence, which zones are designated attentive and inattentive, respectively, will depend on the particular configuration of the vehicle.

As was noted above, the vehicle also has an image capture device or eye-tracking system (not shown) to enable determination of the gaze of the driver. The image capture device can be used to capture images of the driver which allow the gaze region to be determined. For example, the image capture device may capture images showing the head position and/or a pupillary position of the driver. In some embodiments, an eye tracking system associated with or comprising the image capture device may be present in the vehicle. The eye tracking system may be for determining a gaze point or a gaze region of a driver, or a change in the gaze point gaze point or gaze region. Eye tracking system and methods, sometimes referred to as gaze detection systems and methods, include, for example, products produced and available from Tobii Technology AB, and which operate by using near-infrared illumination and an image sensor to detect reflection from the eye of a driver. An example of such a gaze detection system is described in U.S. Pat. No. 7,572,008. Other alternative gaze detection systems may also be employed by the invention, regardless of the technology behind the gaze detection system. The eye tracking system may employ its own processor or the processor of another device (i.e., the processor/computer), or even a cloud-based distributed system in some embodiments, to interpret and process data received. When an eye tracking system is referred to herein, both possible methods of processing data are referred to.

Figure 3:
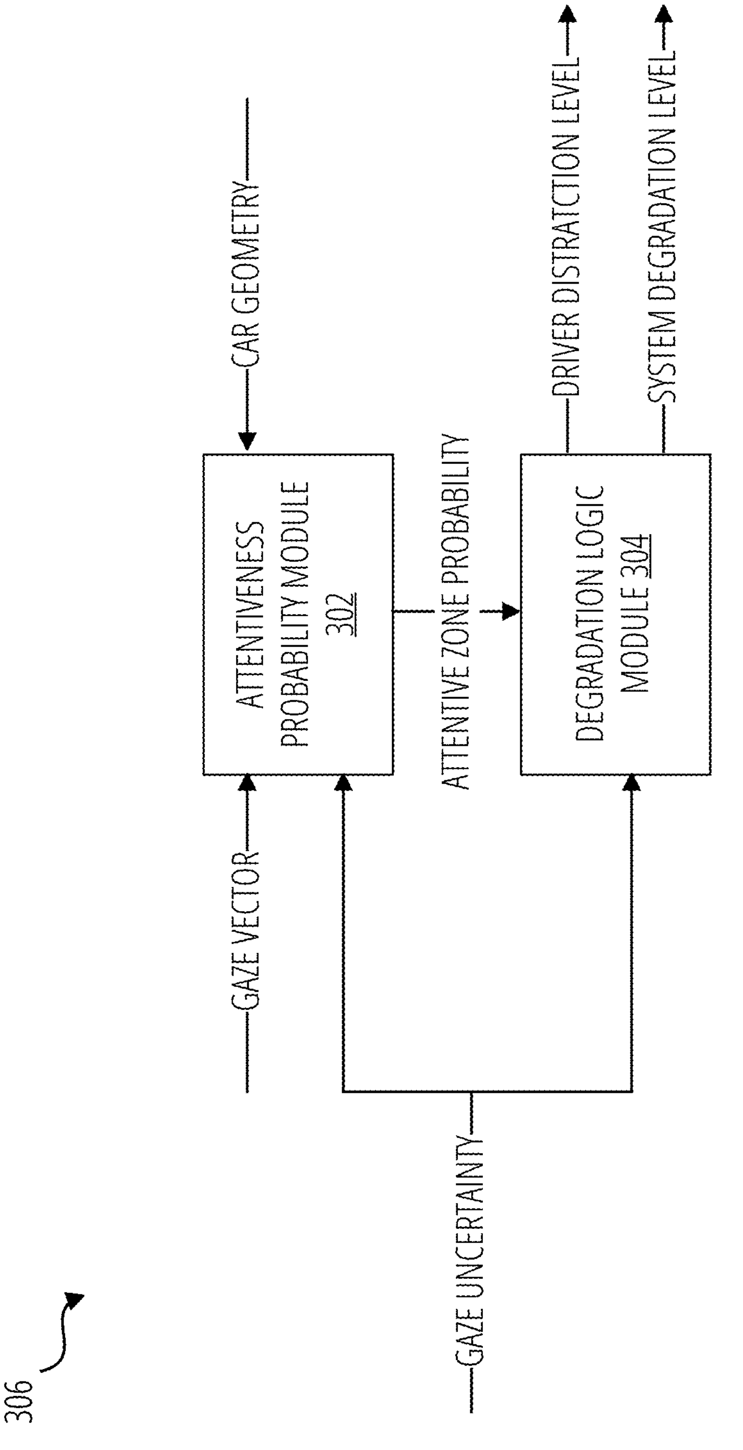
FIG. 3 is a block diagram showing a more detailed view of a portion of the system of FIG. 2, in accordance with some embodiments.

Next, a driver distraction level and a system degradation level are determined, 108, by the degradation module 206. The system degradation level indicates the reliability of the determined driver distraction level. FIG. 3 shows a more detailed view of the degradation module 206, in accordance with one embodiment. As can be seen in FIG. 3, an attentiveness probability module 302 receives the gaze vector, gaze uncertainty, and car geometry 400, and determines an attentive zone probability based on these factors. In one embodiment, the attentive zone probability can be determined by sampling a number of possible gaze points (e.g., 100 points) from the normal distribution of possible gaze points and determining what proportion of them are located inside an attentive zone, for example, when less than 30% of the possible gaze points fall within an attentive zone, the driver might be characterized as "distracted" and when more than 50% of the possible gaze points fall within an attentive zone, the driver might be characterized as "attentive." However, it should be realized that this is only one example of determining an attentive zone probability and that there are also other ways in which the attentive zone probability can be determined, and many ways in which different threshold values can be set based on the situation at hand.

The driver distraction level and system degradation level are determined by a degradation logic module 304, based on the determined attentive zone probability and the gaze uncertainty. Various logic rules and/or machine learning functionality can be set up for making such determinations in accordance with different embodiments. FIGS. 5-9 schematically illustrate some examples of various scenarios of how attentive zone probability and gaze uncertainty can be used to determine a driver distraction level and system degradation level. In FIGS. 5-9, the car geometry 400 of FIG. 4 is used and superimposed thereon are the determined gaze regions illustrated as circles with dashed perimeters, where the center represents the gaze point, and the radius represents the gaze uncertainty.

Figure 5:
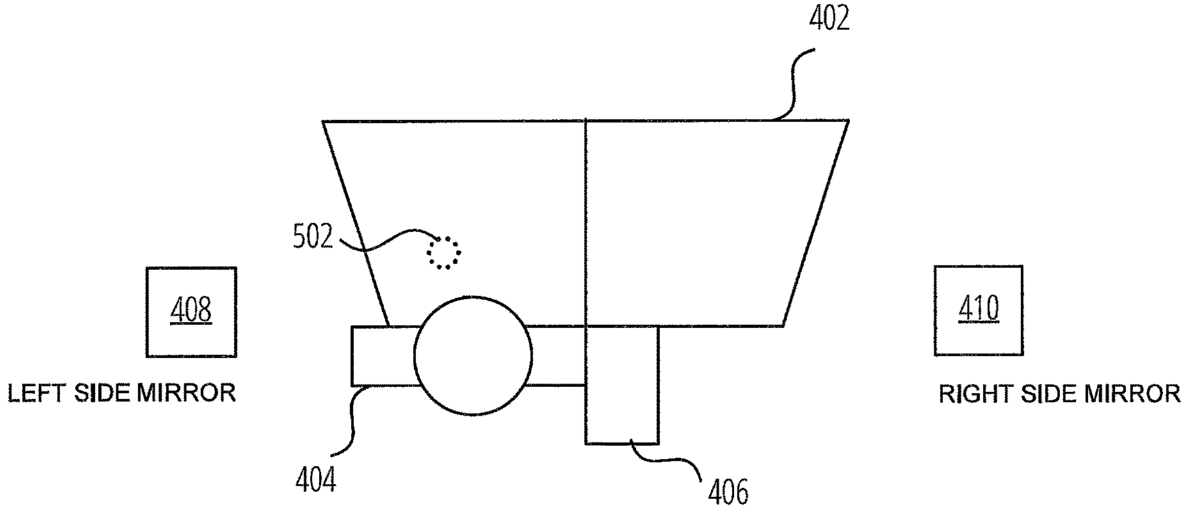
FIG. 5 is a schematic view of the car geometry of FIG. 4, including a gaze region representing the driver looking at the road ahead.

FIG. 5 is a schematic view of the car geometry of FIG. 4, including a gaze region 502 representing the driver looking at the road ahead. The gaze region 502 is clearly within an attentive zone of the windshield 402, that is, the attentive zone probability is very high. Further the gaze region 502 has a small radius, meaning that the gaze uncertainty is low. In this situation, the degradation logic module 304 would typically indicate that the driver is attentive and that the system degradation level is low.

Figure 6:
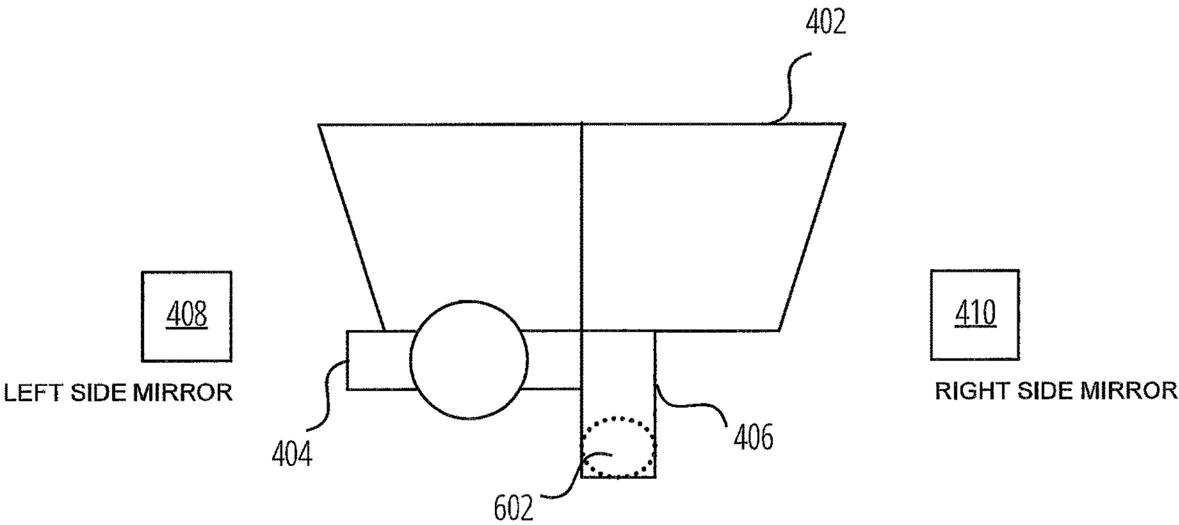
FIG. 6 is a schematic view of the car geometry of FIG. 4, including a gaze region representing the driver not looking at the road ahead.

In FIG. 6, the gaze region 602 is located on the entertainment panel 406. Although the radius of the gaze region 602 is somewhat larger than the radius of the gaze region 502 in FIG. 5 (i.e., indicating that the gaze uncertainty is higher compared to the gaze uncertainty in FIG. 5), it is still clear that the distribution of possible gaze points is entirely located within the entertainment panel 406, which is deemed to be an inattentive zone while driving. Thus, the gaze uncertainty is low. The degradation logic module 304 would indicate that the driver is inattentive and that the somewhat higher, and that the system degradation level is low.

Figure 7:
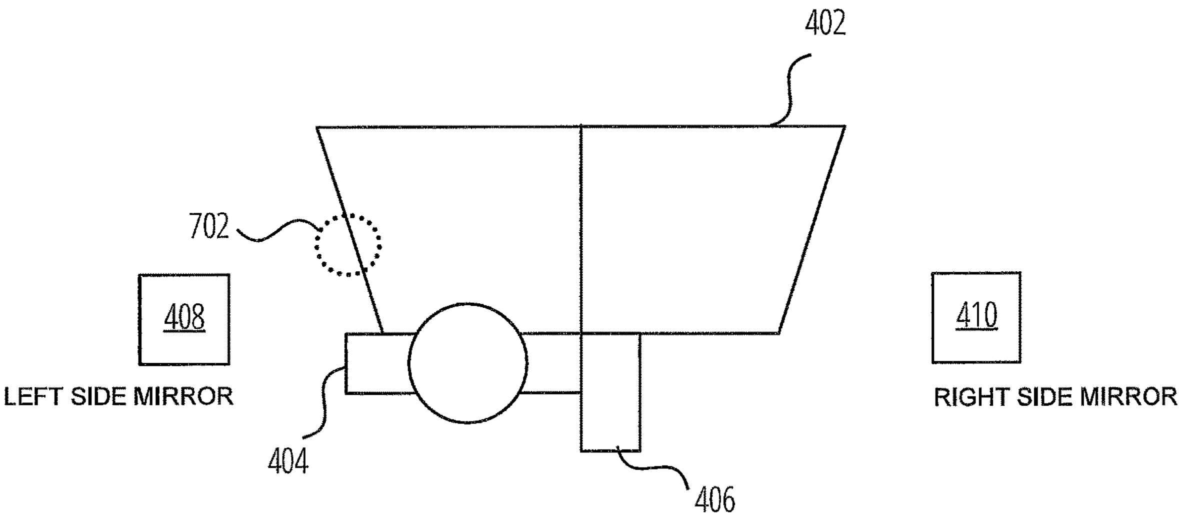
FIG. 7 is a schematic view of the car geometry of FIG. 4, including a gaze region representing uncertainty as to whether the driver is looking at the road ahead.

FIG. 7 shows a situation wherein the gaze region 702 is located at the edge of an attentive zone (i.e., the portion of the windshield 402 in front of the driver), such that some of the possible gaze points in the gaze point distribution are within the attentive zone, and some of the possible gaze points in the gaze point distribution are outside the attentive zone. However, the radius of the gaze region 702 is still relatively small, comparable to the one of FIG. 6. That is, the driver attention is uncertain, but the accuracy of the determination is high or in other terms, gaze uncertainty level is relatively low. Hence, the degradation logic module 304 would indicate that the driver might be partly distracted (or at least that no clear determination can be made), but that the system degradation level is low, and the gaze uncertainty is low.

Figure 8:
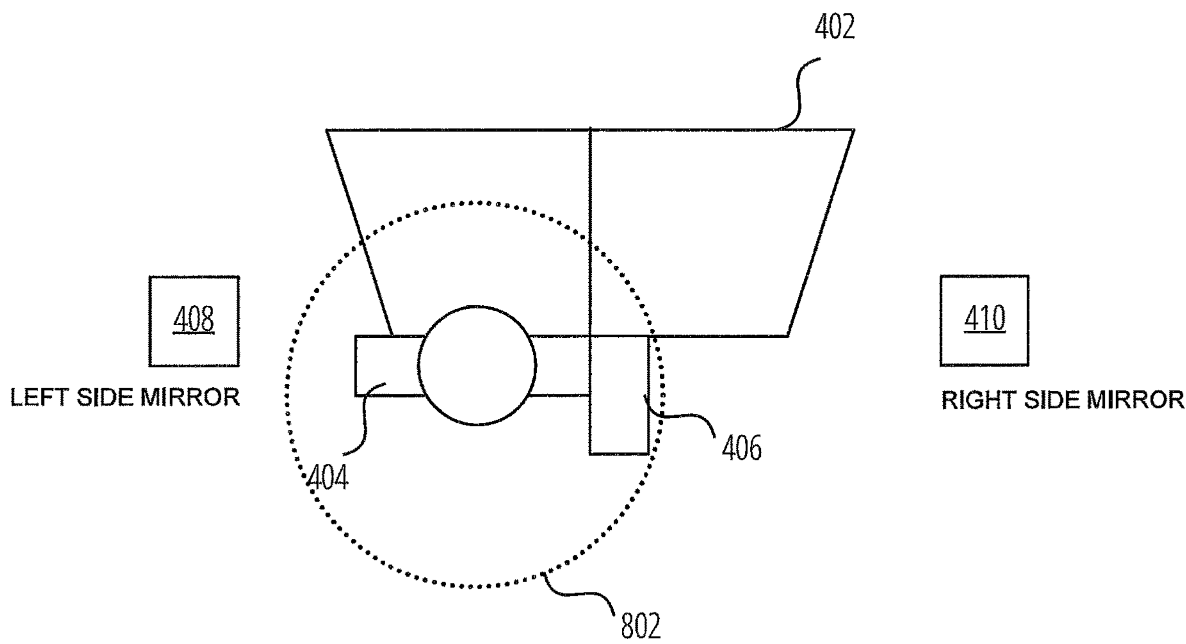
FIG. 8 is a schematic view of the car geometry of FIG. 4, including a gaze region with high uncertainty as to where the driver is looking.

Next, FIG. 8 shows a situation with a large gaze region 802 (i.e., the large gaze region is indicative of a high gaze uncertainty as to where the driver is looking). The gaze region 802 includes attentive zones of the vehicle (e.g., the windshield 402), as well as inattentive zones of the vehicle (e.g., the entertainment panel 406), and/or a possible combination thereof (e.g., dashboard 404). In this situation, the driver could very well be looking attentively at the road ahead, but this is difficult to assess due to the large uncertainty, so typically the degradation logic module 304 would indicate that no clear determination can be made, indicating high gaze uncertainty and high system degradation level. This could, for example, be due to the factors that were initially discussed, such as strong sunlight over eyes, the driver wearing dark sunglasses, high head angles, etc.

Figure 9:
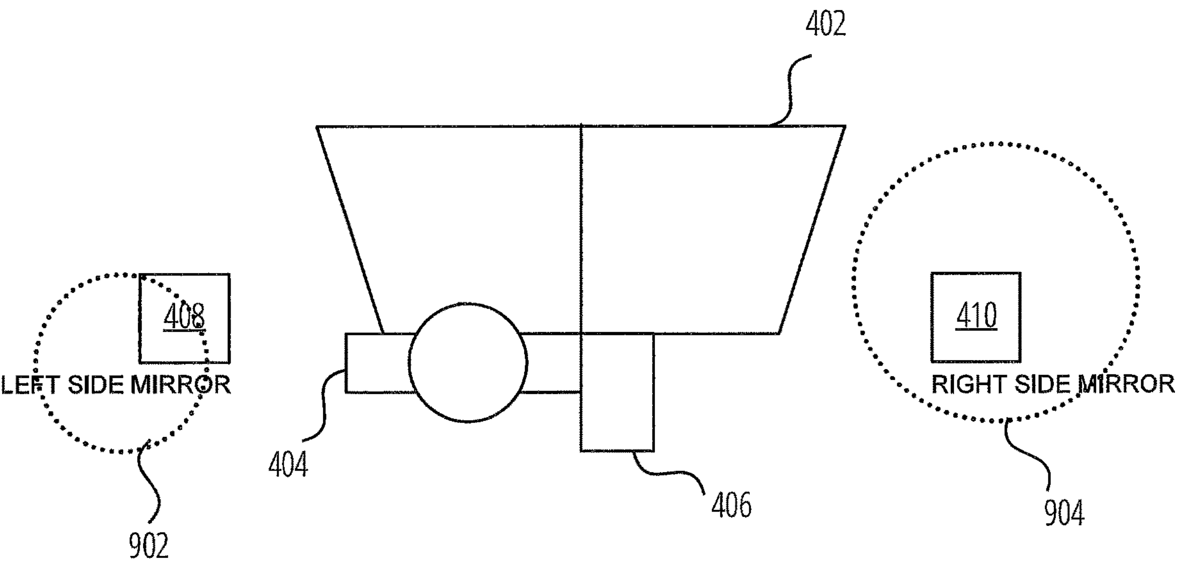
FIG. 9 is a schematic view of the car geometry of FIG. 4, including two gaze regions with different uncertainties but both indicating that the driver is not looking at the road ahead.

The last example, schematically shown in FIG. 9, illustrates two gaze regions 902 and 904, respectively, having different gaze uncertainties (i.e., different radii of the gaze regions), but both indicating that the driver is not looking at the road ahead. Hence, although, the gaze uncertainty is relatively high for both gaze regions 902 and 904, it is clear that both gaze regions are located fully outside the attentive zone (i.e., the windshield), and the degradation logic module 304 will thus indicate a distracted driver, a high gaze uncertainty, and a high system degradation level.

However, it should be noted that all of the examples presented in FIGS. 5-9 are based on a driver moving the vehicle in a forward direction. If the driver instead is backing up the vehicle, then the analysis by the degradation logic module 304 would most likely be different, at least in part. For example, the side mirrors 408 and 410 would likely be designated to be attentive zones and the windshield would be an inattentive zone, which would affect the analysis. Thus, it should be clear that neither the designation of attentive and inattentive zones is static, nor is the analysis by the degradation logic module 304, but these would change based on the circumstances at hand.

Finally, a driver distraction signal and a system degradation signal are output, 110, to a receiving system 208, which ends the method 100. These signals can then be used by the receiving system 208 to provide various alerts or warning signals to the driver, or to control the operation of the vehicle, or to be used for diagnostic purposes, and so on. For example, if the driver is looking at the entertainment panel 406 of the vehicle, and the safety system of the vehicle senses an obstacle up ahead, the system may generate an audio or visual alert to direct the driver's attention to the attentive zone represented by the windshield 402 straight ahead. Similarly, if the safety system of the vehicle senses something behind the vehicle, the system may generate an audio or visual alert to direct the driver's attention to a region associated with the mirrors 408, 410 of the vehicle. This can enhance the safety features of the vehicle. Various threshold values can also be set for what the different signals represent, in different embodiments.

Figure 10:
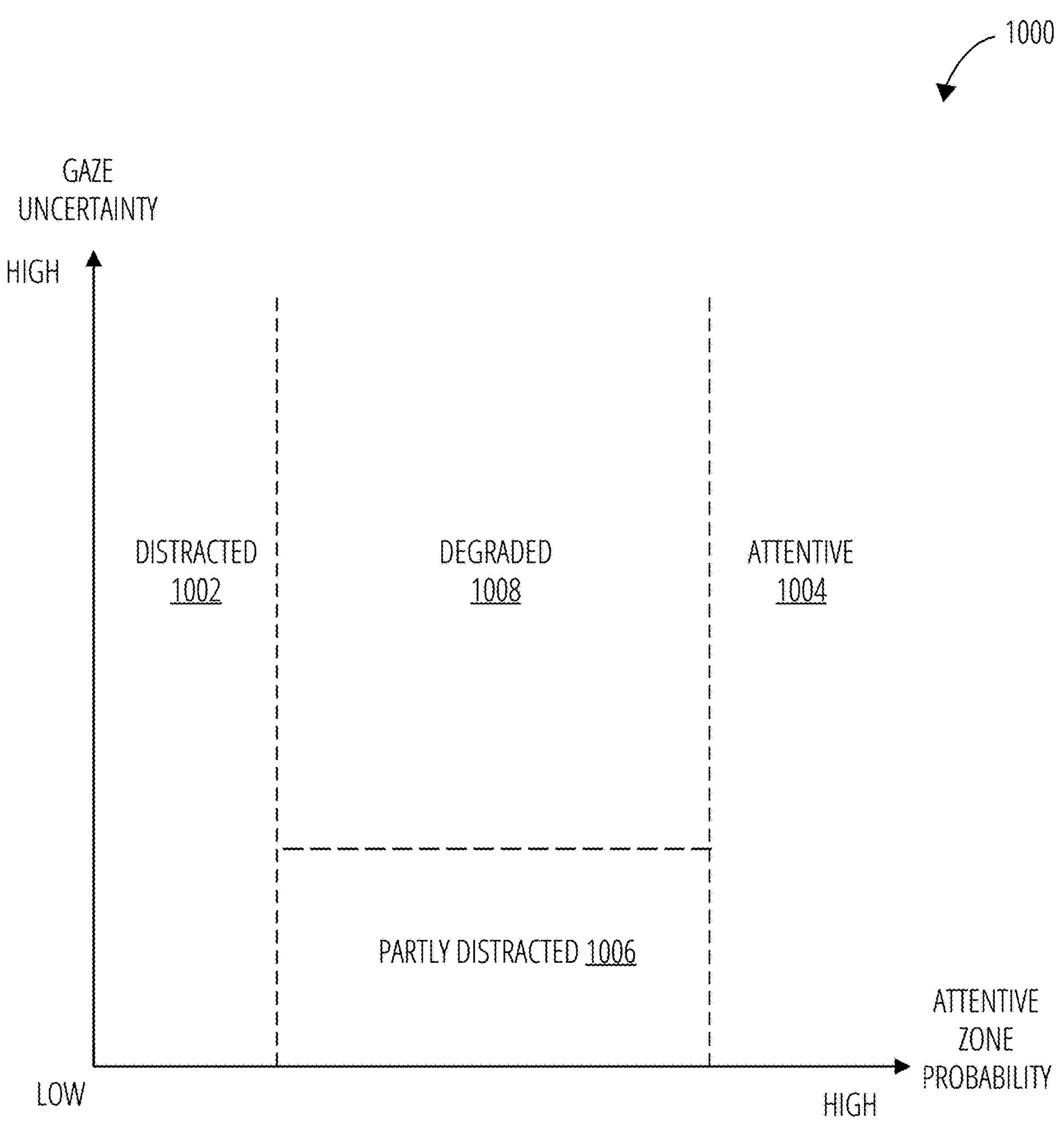
FIG. 10 is a diagram schematically illustrating categories combined attentive zone probability and gaze uncertainty, in accordance with some embodiments.

FIG. 10 shows a schematic diagram 1000 of various possible outputs from the system 200 in accordance with some embodiments. The horizontal axis in FIG. 10 shows an attentive zone probability, i.e., the likelihood of the driver's gaze being in an attentive zone. The vertical axis shows the gaze uncertainty. As can be seen in FIG. 10, the system 200 outputs a "distracted" signal 1002 when the attentive zone probability is low, regardless of the gaze uncertainty level. That is, when it is clear that the driver is not looking at an attentive zone (e.g., as described with respect to FIGS. 6 and 9), then it can be concluded that the driver is distracted, regardless of the level of gaze uncertainty within a certain region of thresholds, of course. Correspondingly, the system 200 outputs an "attentive" signal 1004 when the attentive zone probability is high, regardless of the gaze uncertainty level. That is, when it is clear that the driver is looking at an attentive zone (e.g., as described with respect to FIG. 5), then it can be concluded that the driver is attentive, regardless of the level of gaze uncertainty (i.e., the radius of the gaze region 502 in FIG. 5 could be larger and the resulting output from the system 200 would still remain the same).

In between these "distracted" 1002 and "attentive" 1004 signals, there are a "partly distracted" signal 1006, and a "degraded" signal 1008. Both the "partly distracted" signal 1006 and the "degraded" signal 1008 are output when the attentive zone probability is in between the threshold values for the "distracted" signal 1002 and the "attentive" signal 1004, that is, the attentive zone probability can be determined but the driver's attentiveness cannot be clearly determined. The "partly distracted" signal 1006 is output when the gaze uncertainty is low (e.g., as described with respect to FIG. 7, where it is relatively certain where the driver is looking) and the "degraded" signal 1008 is output when the gaze uncertainty is high (e.g., as described with respect to FIG. 8, where it is unclear where the driver is looking). The criteria for when to output a particular signal and what threshold values to use etc., between the "distracted" 1002, "attentive" 1004, "partly distracted" 1006 and "degraded" 1008 signals, respectively, will of course vary depending on the particular situation at hand and fall within the capabilities of the skilled artisan.

Lastly, it should be noted that while all the analyses above have been presented in the context of a single image, in a real-world scenario, they would be done based on video data, i.e., a stream of images being captured at a rate of 30 frames per second (although other frame rates are also possible), and thus, the driver distraction signal and system degradation signal would typically be continuous signals that would be made available throughout the operation of the vehicle. Furthermore, in order to have more stable signals, various filtering functions (e.g., moving averages, etc.) could be applied to achieve a more robust system. Such modifications lie well within the capabilities of those having ordinary skill in the art.

The embodiments of the present invention described herein may be a system, a method and/or computer program product at any possible technical detail level of integration for providing a driver distraction signal and a system degradation signal indicating a reliability of the driver distraction signal, based on the gaze of a driver of a vehicle, according to what has been described above. The computer program product may include a computer readable storage medium (or media) having computer readable program instructions thereon for causing a processor to carry out aspects of the present invention.

Figure 11:
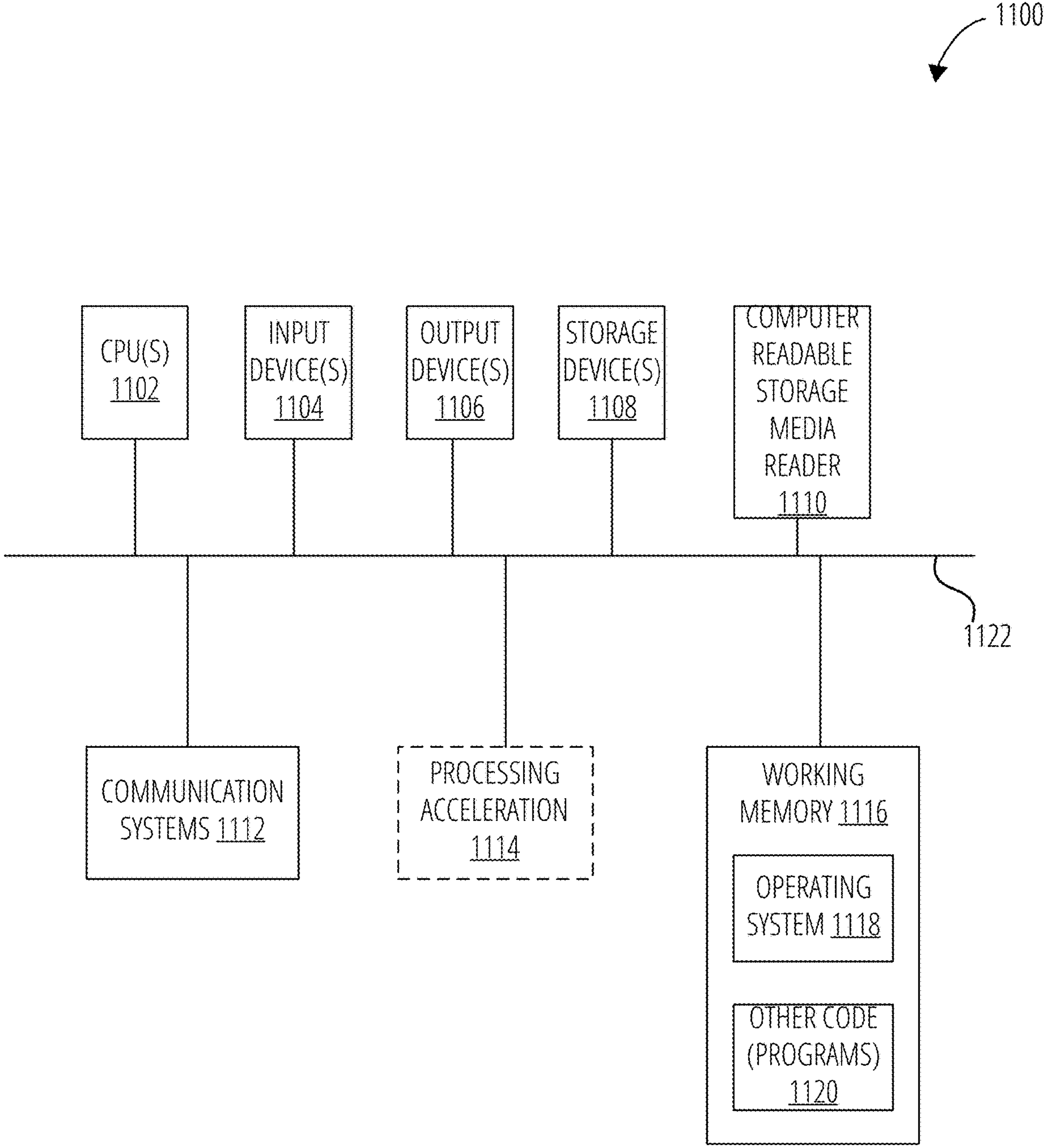
FIG. 11 is a block diagram illustrating a computer system in which embodiments of the method can be implemented.

FIG. 11 is a block diagram illustrating a computer system in which embodiments of the method can be implemented. As can be seen in FIG. 11, a computer system 1100 can be used, in whole, in part, or with various modifications, to provide the functions of the disclosed system. The computer system 1100 includes hardware elements that may be electrically coupled via a bus 1122. The hardware elements may include one or more central processing units 1102, one or more input devices 1104 (e.g., a touch screen, a keyboard, etc.), and one or more output devices 1106 (e.g., a display device, etc.). The computer system 1100 may also include one or more storage device 1108. By way of example, the storage device(s) 1108 may be disk drives, optical storage devices, solid state storage device such as a random-access memory ("RAM") and/or a read-only memory ("ROM"), which can be programmable, flash-updateable and/or the like.

The computer system 1100 may additionally include a computer-readable storage media reader 1110, a communications system 1112 (e.g., a modem, a network card (wireless or wired), an infra-red communication device, Bluetooth™ device, cellular communication device, etc.), and a working memory 1116, which may include RAM and ROM devices as described above. In some embodiments, the computer system 1100 may also include a processing acceleration unit 1114, which can include a digital signal processor, a special-purpose processor and/or the like.

The computer-readable storage media reader 1110 can further be connected to a computer-readable storage medium, together (and, optionally, in combination with the storage device(s) 1108) comprehensively representing remote, local, fixed, and/or removable storage devices plus storage media for temporarily and/or more permanently containing computer-readable information. The communications system 1112 may permit data to be exchanged with a network, system, computer and/or other component described above.

The computer system 1100 may also comprise software elements, shown as being currently located within the working memory 1116, including an operating system 1118 and/or other code 1120. It should be appreciated that alternate embodiments of a computer system 1100 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of the computer system 1100 may include code for implementing any or all of the function of the various elements of the architecture as described herein. For example, software stored on and/or executed by a computer system such as the system 1100, can provide the functions of the disclosed system. Methods implementable by software on some of these components have been discussed above in more detail.

While this specification contains many implementation details, these should not be construed as limitations on the scope of the invention or of what may be claimed, but as descriptions of features specific to implementations of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments. The described program components and systems can be integrated into a single software product or packaged into multiple software products.

Thus, embodiments of the invention have been described. Other embodiments are within the scope of the following claims. Thus, many variations to the above examples lie well within the scope of the attached claims and within the capabilities of a person having ordinary skill in the art.

The invention claimed is:

1. A system configured to provide a driver distraction signal and/or a system degradation signal indicating a reliability of the driver distraction signal, based on a gaze of a driver of a vehicle, the system comprising:

a processor; and a memory comprising instructions executable by the processor, wherein the system is configured to:

receive a plurality of images of the driver of the vehicle, wherein the images contain information indicating a gaze of the driver;

determine, for each image, a gaze region for the driver, wherein the gaze region comprises a gaze point and a dynamic gaze uncertainty value that quantifies confidence in the gaze point estimation for that image, wherein the gaze uncertainty value varies based on at least one of image quality, environmental lighting, driver eyewear, or eye occlusion;

associate, for each image, the gaze region with a region among a plurality of regions around the vehicle, wherein the plurality of regions comprises at least one pre-defined attentive region and at least one pre-defined inattentive region;

determine, based on the determined gaze region, the determined gaze uncertainty value, and the associated region of the vehicle for a plurality of images, a driver distraction level and/or system degradation level indicating a reliability of the driver distraction level, wherein the system degradation level is distinct from the driver distraction level; and output a driver distraction signal and/or a system degradation signal, wherein the driver distraction signal is indicative of the determined driver distraction level and the system degradation signal is indicative of the determined system degradation level.

2. The system of claim 1, wherein the gaze region is a probability distribution with the gaze point being a mean value of the probability distribution and the gaze uncertainty value being a standard deviation of the probability distribution, and wherein the probability distribution is derived using a loss function that minimizes Kullback-Leibler divergence.

3. The system of claim 2, wherein the driver distraction level is based on what portion of the gaze region falls within an attentive region or an inattentive region, respectively.

4. The system of claim 3, wherein a high driver distraction level is obtained when a significant portion of the gaze region falls within an inattentive region, and a low driver distraction level is obtained when a significant portion of the gaze region falls within an attentive region.

5. The system of claim 1, wherein the system is further configured to:

set one or more threshold signal values for the distraction signal and the system degradation signal to indicate one or more levels of driver distraction and one or more levels of system degradation, respectively.

6. The system of claim 1, wherein the system is further configured to:

categorize the driver distraction signal into one of the following categories: attentive, distracted, degraded, and undetermined; and associate the determined reliability with the determined category.

7. The system of claim 1, wherein the gaze region is determined using machine-learning based gaze estimation algorithm.

8. The system of claim 1, wherein the system is further configured to control an apparatus of the vehicle based on the output driver distraction signal and/or the system degradation signal.

9. A method for providing a driver distraction signal and/or a system degradation signal indicating a reliability of the driver distraction signal, based on a gaze of a driver of a vehicle, comprising:

receiving a plurality of images of the driver of the vehicle, wherein the images contain information indicating a gaze of the driver;

determining, for each image, a gaze region for the driver, wherein the gaze region comprises a gaze point and a dynamic gaze uncertainty value that quantifies confidence in the gaze point estimation for that image, wherein the gaze uncertainty value varies based on at least one of image quality, environmental lighting, driver eyewear, or eye occlusion;

associating, for each image, the gaze region with a region among a plurality of regions around the vehicle, wherein the plurality of regions comprises at least one pre-defined attentive region and at least one pre-defined inattentive region;

determining, based on the determined gaze region, the determined gaze uncertainty value, and the associated region of the vehicle for a plurality of images, a driver distraction level and/or system degradation level indicating a reliability of the driver distraction level, wherein the system degradation level is distinct from the driver distraction level; and outputting a driver distraction signal and/or a system degradation signal, wherein the driver distraction signal is indicative of the determined driver distraction level and the system degradation signal is indicative of the determined system degradation level.

10. A non-transitory computer-readable medium comprising instructions which, when executed on at least one processor, cause the at least one processor to carry out the method of claim 9.

11. An eye tracking system configured to provide a driver distraction signal, based on a gaze of a driver of a vehicle in accordance with the method of claim 9.

12. A driver monitoring system (DMS) for monitoring a driver of a vehicle, the DMS comprising the eye tracking system of claim 11.

13. The driver monitoring system (DMS) according to claim 12, further comprising the computing program according to claim 9.

14. A vehicle comprising the system of claim 1.

15. A vehicle comprising the system of claim 4.

16. A vehicle comprising the system of claim 6.

17. A vehicle comprising the eye tracking system of claim 11.

18. A vehicle comprising the driver monitoring system (DMS) of claim 12.

19. A vehicle comprising the driver monitoring system (DMS) of claim 12.

* * * * *